United States Patent
Bustillo et al.

(10) Patent No.: US 10,384,793 B2
(45) Date of Patent: Aug. 20, 2019

(54) NACELLE COMPRISING AN EXCHANGER FOR COOLING A STREAM OF FLUID

(71) Applicant: SAFRAN AIRCRAFT ENGINES, Paris (FR)

(72) Inventors: Sara Bustillo, Moissy-Cramayel (FR); Maria Natal, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 368 days.

(21) Appl. No.: 15/125,783

(22) PCT Filed: Mar. 10, 2015

(86) PCT No.: PCT/FR2015/050586
§ 371 (c)(1),
(2) Date: Sep. 13, 2016

(87) PCT Pub. No.: WO2015/136210
PCT Pub. Date: Sep. 17, 2015

(65) Prior Publication Data
US 2017/0021937 A1     Jan. 26, 2017

(30) Foreign Application Priority Data

Mar. 13, 2014   (FR) ...................................... 14 52091

(51) Int. Cl.
*B64D 33/10*     (2006.01)
*B64D 27/10*     (2006.01)
(Continued)

(52) U.S. Cl.
CPC ............. *B64D 33/10* (2013.01); *B64D 27/10* (2013.01); *B64D 29/00* (2013.01); *F02C 7/14* (2013.01);
(Continued)

(58) Field of Classification Search
CPC .......... F01D 25/08; F01D 25/14; F01D 25/12; B64D 33/08; B64D 33/10
See application file for complete search history.

(56) References Cited

U.S. PATENT DOCUMENTS 9,982,599 B2 *   5/2018   Suciu ...................... F02C 7/052
2005/0150970 A1  7/2005   Beutin et al.
(Continued)

FOREIGN PATENT DOCUMENTS

EP    2 864 996 A1    7/2005
EP    1 882 824 A2    1/2008
(Continued)

OTHER PUBLICATIONS

International Search Report dated Jun. 10, 2015, in PCT/FR2015/050586 filed Mar. 10, 2015.
(Continued)

*Primary Examiner* — Jason D Shanske
*Assistant Examiner* — John S Hunter, Jr.
(74) *Attorney, Agent, or Firm* — Oblon, McClelland, Maier & Neustadt, L.L.P.

(57) ABSTRACT

A nacelle for a propulsion unit includes at least one scoop opening to the external air, and a canal supplying external air from the scoop to two ducts which separate downstream of the canal, forming a dividing lip, and at least one exchanger to cool a stream of fluid entering the exchanger. The exchanger is arranged in the region of and in contact with the separation lip. The external air circulates from the scoop towards the two ducts making it possible to cool the stream of fluid entering the exchanger.

9 Claims, 4 Drawing Sheets

(51) Int. Cl.
*F02C 7/18* (2006.01)
*B64D 29/00* (2006.01)
*F02C 7/14* (2006.01)

(52) U.S. Cl.
CPC .......... *F02C 7/18* (2013.01); *F05D 2220/323* (2013.01); *F05D 2220/324* (2013.01); *F05D 2260/213* (2013.01); *F05D 2260/98* (2013.01); *Y02T 50/672* (2013.01); *Y02T 50/676* (2013.01)

(56) References Cited

U.S. PATENT DOCUMENTS

| | | |
|---|---|---|
| 2008/0016845 A1 | 1/2008 | Zysman et al. |
| 2011/0179767 A1 | 7/2011 | Rinjonneau et al. |
| 2013/0219854 A1 | 8/2013 | Alecu |
| 2014/0369812 A1 | 12/2014 | Caruel et al. |

FOREIGN PATENT DOCUMENTS

| | | | |
|---|---|---|---|
| EP | 2 348 211 A1 | 7/2011 | |
| EP | 2 987 602 A1 | 9/2013 | |
| FR | 2 955 616 A1 | 7/2011 | |
| WO | WO-2014092778 A1 * | 6/2014 | .............. F02C 7/052 |

OTHER PUBLICATIONS

Combined French Preliminary Search Report and Written Opinion dated Nov. 18, 2014 in patent Application No. FR 1452091 (with English translation of Categories of Cited Documents).

International Search Report dated Jun. 10, 2015 in PCT/FR2015/050586 (with English translation of Categories of Cited Documents).

* cited by examiner

NACELLE COMPRISING AN EXCHANGER FOR COOLING A STREAM OF FLUID

FIELD OF THE INVENTION

The invention relates to a nacelle for a propulsion unit, said nacelle comprising an exchanger configured for cooling a fluid flow.

PRESENTATION OF THE PRIOR ART

Installing an air/air exchanger of the SACAC type (surface air cooled air cooler) in a turbine engine for cooling an air flow, drawn for example at a pressurized air bleed outlet of a compressor, is known. In the case of a compressor with several compressor stages, such a bleed outlet can be provided to communicate with the air under pressure of the last stage or of a preceding stage.

As illustrated in FIG. 1, the exchanger 52 receives a stream of hot air 51 (with a temperature typically above 200° C.) coming from an air bleed outlet of a high-pressure compressor 50. At it leaves the heat exchanger 52, the air flow 53 is cooled and has a temperature less than 200° C.

In the case of turbofans, the exchanger is positioned on the secondary stream, so as to cool the air flow entering the heat exchanger using the air of the secondary stream.

In the case of turboprops, the equivalent of the secondary stream is the air that passes around the nacelle and is accelerated by the propellers. The exchanger must therefore be positioned outside the nacelle. However, this solution causes interferences with the flow around the nacelle, which increases drag. This solution is therefore not satisfactory.

PRESENTATION OF THE INVENTION

So as to correct these disadvantages, the invention proposes a nacelle for a propulsion unit comprising at least one scoop opening to the exterior air, a channel feeding with exterior air, from the scoop, two ducts which separate downstream of the channel forming a separator nose, characterized in that it comprises at least one exchanger configured to cool a fluid flow entering the exchanger, said exchanger being positioned at and in contact with the separator nose, the exterior air circulating from the scoop to the two ducts allowing cooling of the fluid flow entering the exchanger.

The invention is advantageously completed by the following characteristics, taken alone or in any one of their technically possible combinations:

- the exchanger comprises a frame and a plurality of fins positioned on one or more faces of the frame;
- the exchanger is attached to at least one of the ducts by at least one plate;
- the ducts have a wall made of composite material and the plate is made of metal;
- the frame has a tapered profile at its leading edge;
- the fluid flow entering the exchanger is an air flow bled at an outlet of a compressor of the turbine engine;

The invention also relates to a turboprop comprising a nacelle as described and a turbine engine. In one embodiment, an air inlet of the exchanger is connected to an outlet of a compressor of the turbine engine, so as to cool the air flow bled at this outlet of the compressor.

The invention also relates to a method for mounting an exchanger receiving a fluid flow to be cooled, in a turbine engine comprising a nacelle wherein is provided at least one scoop opening to the exterior air, a channel feeding with exterior air, from the scoop, two ducts which separate forming a separator nose, characterized in that it comprises the steps of forming an opening in the separator nose, introducing the exchanger through the opening, and positioning it at the separator nose so that the exchanger separates the two ducts. The method can further comprise the step of attaching the exchanger to one of the ducts through a plate.

The invention has numerous advantages.

The invention makes it possible to cool a fluid flow through an exchanger simply and effectively.

In particular, it makes it possible to re-use a flow of cold air circulating in the ducts of the propulsion unit so as to cool the fluid flow entering the exchanger.

In addition, the invention makes it possible both to resolve the icing problem which can occur in certain areas of the propulsion unit, in particular on the separator noses of the ducts, and to cool a flow of hot fluid passing through an exchanger of the propulsion unit.

The invention thus allows dispensing with the installation of many ducts which would be necessary for eliminating icing and cooling the fluid flow entering the exchanger.

PRESENTATION OF THE FIGURES

Other features and advantages of the invention will be revealed by the description that follows, which is purely illustrative and not limiting, and must be read with reference to the appended drawings wherein.

DETAILED DESCRIPTION

Figure 1:
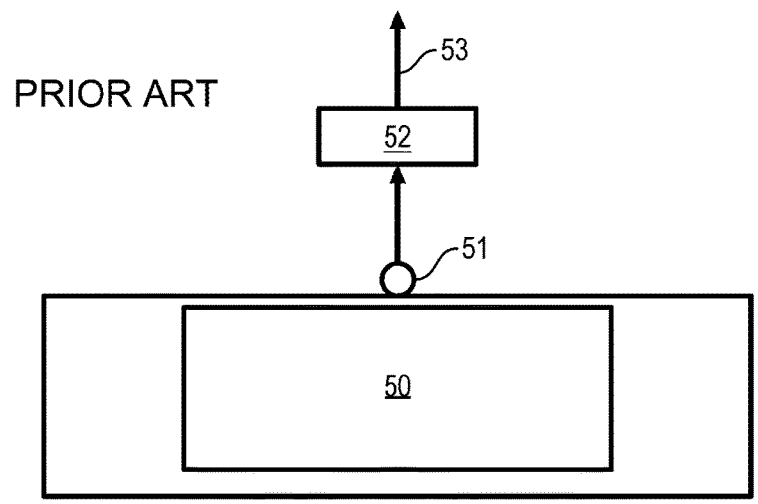
FIG. 1 is a representation of the operation of an air/air exchanger in a turbine engine.
Figure 2:
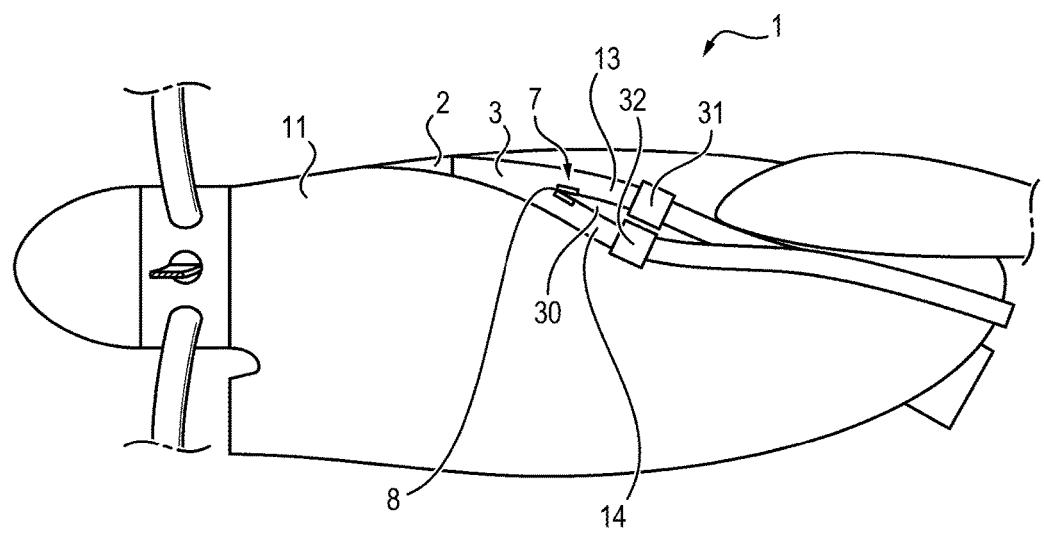
FIG. 2 is a representation of a propulsion unit according to the invention, in side view.
Figure 3:
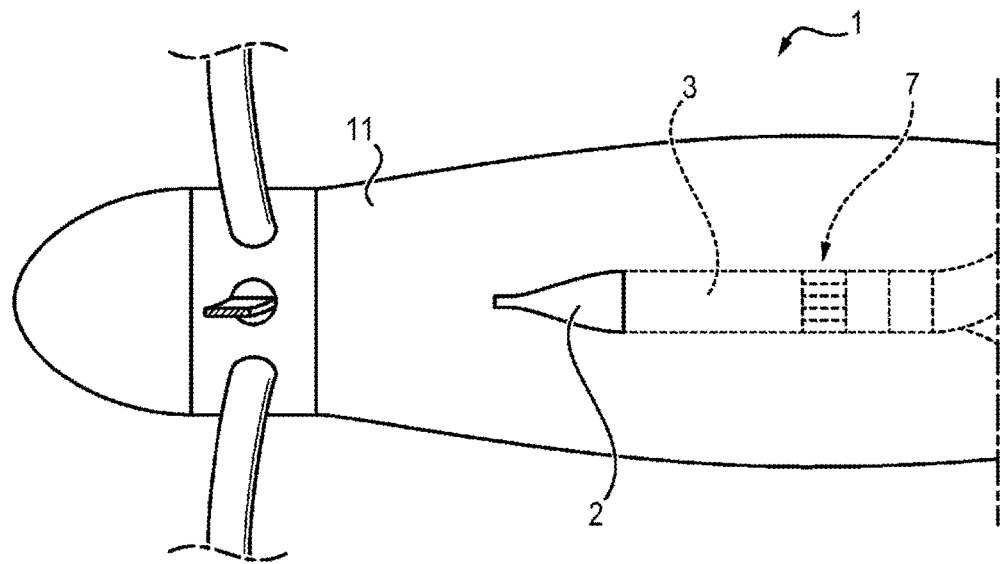
FIG. 3 is a representation of a propulsion unit according to the invention, in top view.
Figure 4:
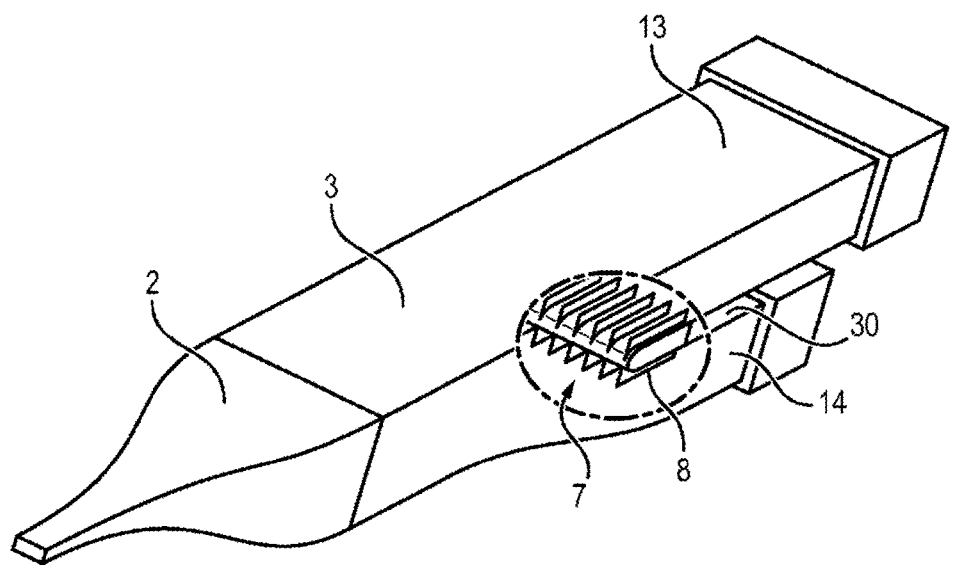
FIG. 4 is a representation of the positioning of the exchanger at the separator nose of the two ducts.
Figure 5:
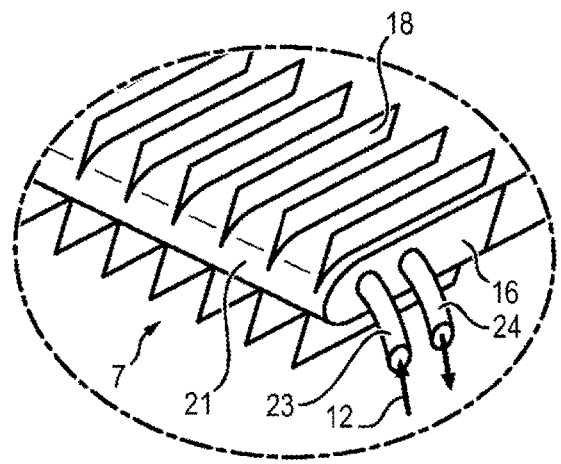
FIG. 5 is a representation of the exchanger.
Figure 6:
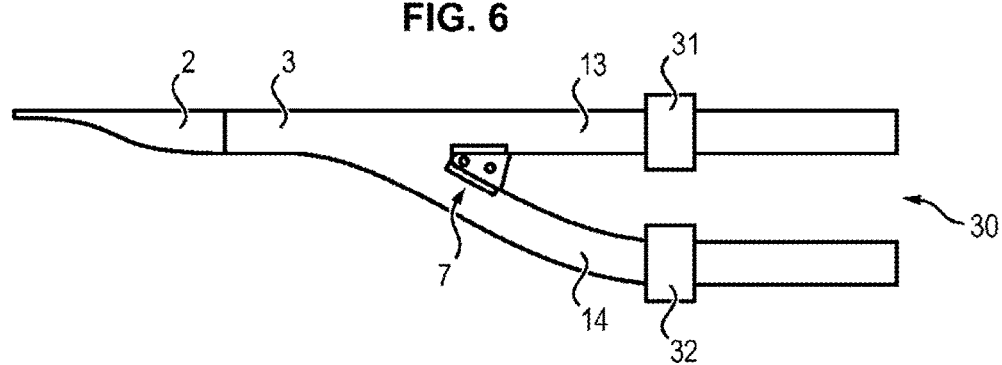
FIG. 6 is a representation of FIG. 4 in side view.
Figure 7:
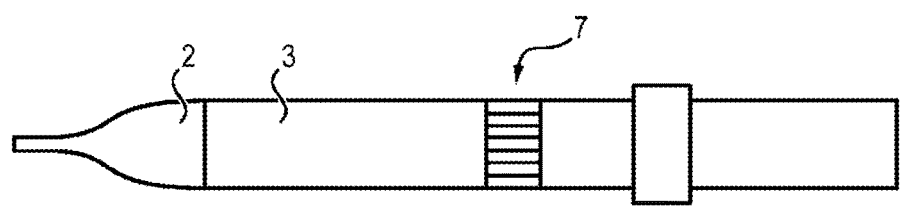
FIG. 7 is a representation of FIG. 4 in top view.
Figure 8:
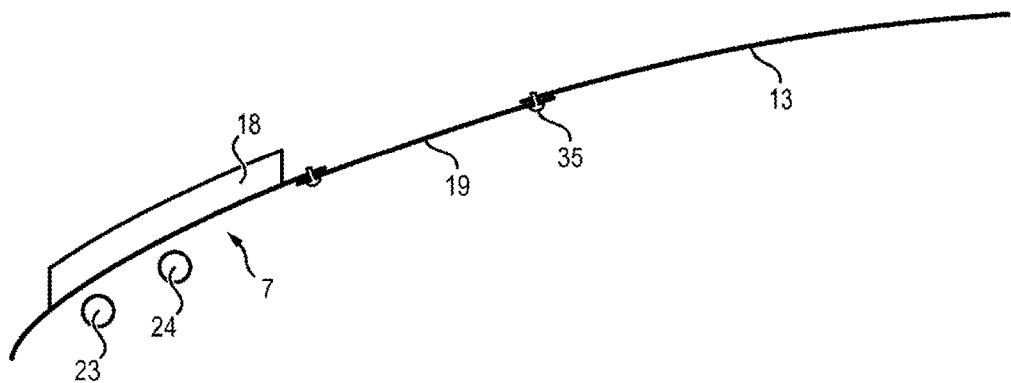
FIG. 8 is a representation of the attachment of the exchanger to a duct through a plate.

Shown in FIGS. 2 and 3 is a propulsion assembly 1 of an aircraft. In these figures, the propulsion assembly 1 is a turboprop.

The propulsion assembly 1 comprises a turbine engine and a nacelle 11 in which is provided at least one scoop 2 opening to the exterior air. During displacement of the aircraft, the exterior air penetrates into the nacelle 11 through the scoop 2. Generally, the scoop 2 is placed at 12 o'clock (azimuth angle).

A duct channel 3 is connected to the scoop 2 and is fed with exterior air. This duct channel 3 feeds two ducts 13, 14 in the nacelle 11, which separate to form a separator nose 8. The two ducts 13, 14 each constitute a distinct extension of the duct channel 3. As illustrated, the two ducts 13, 14 separate downstream of the duct channel 3 (the upstream-downstream direction being defined by the direction of flow of the exterior air in and around the nacelle 11).

The separator nose 8 is at the junction between the duct channel 3 and the inlet of the two ducts 13, 14. It delimits the separation between the inlets of the two ducts 13, 14. This separator nose 8 can be flat or protruding.

After the separator nose 8, the ducts 13, 14 are separated by a slot 30 and are therefore quite distinct.

The ducts 13, 14 are for example respectively a duct which feeds cold air to equipment 31 (which is for example the "air cooled oil cooler" which cools the oil of the "variable frequency generator") and a duct which feeds cold air to equipment 32 (which is for example the "pre-cooler" or upstream cooler).

The nacelle 11 further comprises at least one exchanger 7 configured to cool a fluid flow 12 entering said exchanger 7.

This is for example an air flow bled from a pressurized air bleed outlet of a compressor of the turbine engine of the propulsion unit. In this case, an air inlet of the exchanger is connected to the bleed outlet of the compressor of the turbine engine, so as to cool the air flow bled from the compressor.

Once cooled, the air flow can in particular be sent to equipment which controls pneumatic valves.

This can be any fluid which it is desired to cool (lubrication oil, heat transport fluid, etc.).

The exchanger 7 is positioned at the separator nose 8. Consequently, the exterior air entering the scoop 2, and passing through the duct channel 3, then the two ducts 13, 14 flows around the exchanger 7. As illustrated, the exchanger 7 is in contact with said separator nose 8.

The fluid flow 12 entering the exchanger 7 is cooled by the circulation of exterior air flowing around the exchanger 7.

This judicious configuration makes it possible to re-use existing ducts 13, 14 so as to cool the fluid flow entering the exchanger 7. It is therefore not necessary to re-create a new circulation of cold air so as to cool the fluid flow 12 entering the exchanger 7.

The structure of the exchanger 7 is cooled on its two faces by the air circulating toward the duct 13 and the air circulating toward the duct 14. Thanks to this installation, the space required by the exchanger 7 is reduced.

Moreover, the separator nose 8 is generally subject to the formation of ice. Thanks to the sound positioning of the exchanger 7 at the separator nose 8, icing is eliminated, and it is not necessary to install additional devices so as to combat the formation of ice, such as de-icing ducts.

In one embodiment, the exchanger 7 comprises a frame 16 and a plurality of fins 18 positioned on one or more faces of the frame 16. One or more frame inlet channels 23 bring the fluid flow 12 to be cooled into the frame 16. The fluid flow 12 leaves the frame 16, by the same side or by another side, via at least one other frame outlet channel 24, with a lower temperature.

The fins 18 make it possible to channel and to guide the exterior air around the frame 16 of the exchanger 7, which improves thermal exchanges and therefore the effectiveness of cooling. Advantageously, the fins 18 are positioned on either side of the frame 16. They extend parallel to one another, and are parallel to the flow direction of the exterior air.

In one embodiment, the frame 16 has a tapered profile in its leading edge 21. This configuration makes it possible to improve the flow of exterior air around the frame 16.

According to another embodiment, the turbine engine is a turboprop.

The attachment of the exchanger 7 can for example be accomplished through at least one plate 19. The plate 19 is, on the one hand, attached to one of the ducts 13, 14 and on the other hand to the exchanger 7. The attachment is for example achieved via screws 35.

Generally, the ducts 13, 14 have a wall made of composite material. The frame 16, for its part, is made of metal. So as to connect the frame 16 to at least one of the ducts, the plate 19 can be made of metal.

Figure 9:
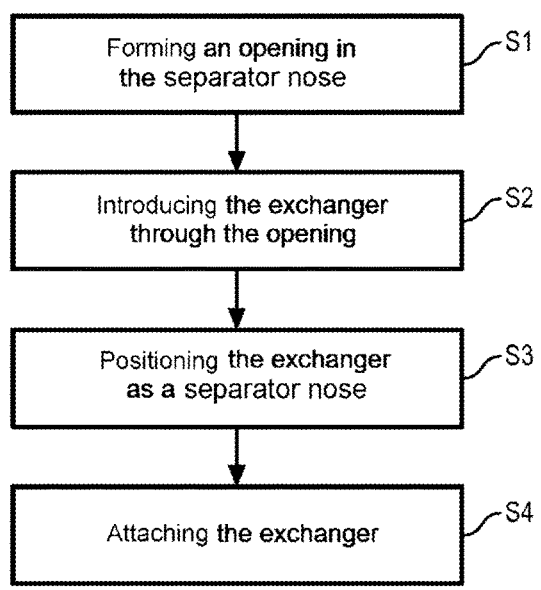
FIG. 9 is a representation of an embodiment of a method for mounting an exchanger.

With reference to FIG. 9, a method for mounting the exchanger 7 in the nacelle 11 of the propulsion unit 1 is described.

The method comprises step S1 of forming an opening in the separator nose 8 separating the two ducts 13, 14.

The section and the dimensions of the opening are selected so as to correspond to the section and the dimensions of the exchanger 7. For example, the opening has a rectangular section, the area whereof allows the exchanger 7 with the fins 18 to pass.

In step S2, the exchanger 7 is introduced through the opening and is positioned (step S3) at the separator nose 8 so that the exchanger 7 separates the two ducts 13, 14. The exchanger 7 then plays the role of a separator nose between the two ducts 13, 14.

Finally, the frame 16 of the exchanger 7 is attached to at least one of the ducts 13, 14 through at least one plate 19 (step S4).

The invention claimed is:

1. A nacelle for a propulsion unit comprising:
   at least one scoop opening to exterior air,
   a channel feeding with exterior air, from the at least one scoop, two ducts which separate downstream of the channel forming a separator nose, and
   at least one exchanger configured to cool a fluid flow entering the at least one exchanger, said at least one exchanger forms a portion of the separator nose such that the at least one exchanger separates the exterior air into the two ducts, so that a structure of the at least one exchanger is cooled on two faces by air circulating towards each of the two ducts.

2. The nacelle according to claim 1, wherein the at least one exchanger comprises:
   a frame, and
   a plurality of fins positioned on one or more faces of the frame.

3. The nacelle according to claim 2, wherein a leading edge of the frame has a tapered profile.

4. The nacelle according to claim 1, wherein the at least one exchanger is attached to at least one of the two ducts by at least one plate.

5. The nacelle according to claim 4, wherein the two ducts have a wall made of composite material and the at least one plate is made of metal.

6. A turboprop comprising a turbine engine and the nacelle according to claim 1.

7. The turboprop according to claim 6, wherein an air inlet of the at least one exchanger is connected to a pressurized air bleed outlet of a compressor of the turbine engine, so as to cool an air flow bled from the compressor.

8. A method for mounting an exchanger receiving a fluid flow to be cooled, in a nacelle of a propulsion unit comprising:
   at least one scoop opening to exterior air, and
   a channel feeding with exterior air, from the at least one scoop, two ducts which separate downstream of the channel forming a separator nose, the method comprising:

forming an opening in the separator nose, and introducing the exchanger through the opening, and positioning the exchanger at the separator nose so that the exchanger separates the two ducts.

9. The method according to claim 8, further comprising attaching the exchanger to one of the two ducts through a plate.

\* \* \* \* \*